(12) United States Patent
Guvenc et al.

(10) Patent No.: US 8,442,541 B2
(45) Date of Patent: May 14, 2013

(54) SYSTEM AND METHOD FOR INTER-CELL INTERFERENCE AVOIDANCE IN CO-CHANNEL NETWORKS

(75) Inventors: Ismail Guvenc, Santa Clara, CA (US); Moo Ryong Jeong, Albany, CA (US); Fujio Watanabe, Union City, CA (US)

(73) Assignee: NTT DoCoMo, Inc., Tokyo (JP)

( * ) Notice: Subject to any disclaimer, the term of this patent is extended or adjusted under 35 U.S.C. 154(b) by 83 days.

(21) Appl. No.: 13/073,137

(22) Filed: Mar. 28, 2011

(65) Prior Publication Data

US 2011/0237243 A1 Sep. 29, 2011

Related U.S. Application Data

(60) Provisional application No. 61/318,694, filed on Mar. 29, 2010.

(51) Int. Cl.
*H04W 24/08* (2009.01)
(52) U.S. Cl.
USPC .......................................... 455/450; 455/423
(58) Field of Classification Search .................. 455/418, 455/423, 436, 450; 370/252, 335, 336
See application file for complete search history.

(56) References Cited

U.S. PATENT DOCUMENTS

| | | | |
|---|---|---|---|
| 5,828,948 A | 10/1998 | Almgren et al. | |
| 6,282,434 B1 | 8/2001 | Johannisson et al. | |
| 7,193,978 B2 | 3/2007 | Ishikawa et al. | |
| 2006/0092881 A1 | 5/2006 | Laroia et al. | |
| 2008/0268833 A1* | 10/2008 | Huang et al. | 455/425 |
| 2009/0088176 A1 | 4/2009 | Teo et al. | |
| 2009/0110087 A1 | 4/2009 | Liu et al. | |
| 2009/0221295 A1 | 9/2009 | Sahin et al. | |
| 2009/0270109 A1 | 10/2009 | Wang Helmersson et al. | |
| 2009/0290550 A1 | 11/2009 | Bhattad et al. | |
| 2010/0029282 A1 | 2/2010 | Stamoulis et al. | |
| 2010/0056167 A1 | 3/2010 | Guvenc | |

OTHER PUBLICATIONS

"3rd Generation Partnership Project; Technical Specification Group Radio Access Networks; 3G Home NodeB Study Item Technical Report (Release 8)," 3GPP, 3GPP TR 25.820, Mar. 2008.
FemtoForum, "Interference management in UMTS femtocells," White Paper, Dec. 2008.
R4-091976, "LTE-FDD HeNB Interference Scenarios," Vodafone, 3GPP Standard Contribution.

(Continued)

*Primary Examiner* — Sam Bhattacharya
(74) *Attorney, Agent, or Firm* — Haynes and Boone, LLP

(57) ABSTRACT

Systems and methods are provided for a distributed inter-cell interference avoidance (ICIA) technique for avoiding co-channel interference between femtocell networks and macrocell networks. At the macrocell, user equipments sense the downlink (DL) spectrum and detects whether there are any nearby interfering femtocells. If there is any interference, a macrocell base station appropriately re-schedules the DL resources and also uses a mapping function to re-schedule uplink (UL) resources based on the re-scheduled DL resources. At the femtocell, a femtocell base station senses the UL spectrum to detect for interference from nearby macrocell users. If there is interference, femtocell gives priority for use of the resources to the macrocell by releasing UL resources. Femtocell may also use the same mapping function to obtain the DL resources used by the macrocell and to re-schedule DL and UL resources of the femtocell to avoid using the DL and UL resources of the macrocell.

11 Claims, 11 Drawing Sheets

OTHER PUBLICATIONS

S. P. Yeh, S. Talwar, S. C. Lee, and H. Kim, "WiMAX femtocells: a perspective on network architecture, capacity, and coverage," IEEE Commun. Mag., vol. 46, No. 10, pp. 58-65, Oct. 2008.

D. L. Perez, A. Valcarce, G. D. L. Roche, E. Liu, and J. Zhang;, "Access methods to WiMAX femtocells: A downlink system-level case study," in Proc. IEEE Int. Conf. Commun. Syst. (ICCS), Guangzhou, China, Nov. 2008, pp. 1657-1662.

H. Claussen, "Performance of macro- and co-channel femtocells in a hierarchical cell structure," in Proc. IEEE Int. Symp. Personal, Indoor, Mobile Radio Commun. (PIMRC), Athens, Greece, Sep. 2007, pp. 1-5.

PCT International Search Report and Written Opinion dated May 27, 2011.

* cited by examiner

SYSTEM AND METHOD FOR INTER-CELL INTERFERENCE AVOIDANCE IN CO-CHANNEL NETWORKS

CROSS REFERENCE TO RELATED APPLICATIONS

This patent application claims the benefit of U.S. Provisional Patent Application No. 61/318,694, filed on Mar. 29, 2010. The entire contents of this provisional patent application are hereby expressly incorporated by reference.

FIELD OF THE INVENTION

The present invention generally relates to wireless communications technology. More specifically, it relates to inter-cell interference avoidance between macrocells and femtocells.

RELATED ART

Cellular networks may deploy small networks such as co-channel femtocell networks to reuse the spectrum resources of a macrocell. For example, a network may include macrocell base stations (mBS) and corresponding macrocell mobile stations (mMS) as well as femtocell base stations (fBS) and corresponding femtocell mobile stations (fMS). Macrocell mobile stations are also denoted as user equipment (UE) whereas macro base stations are also denoted as evolved NodeB (eNB). Femtocell mobile stations are similarly denoted as femtocell user equipment (FUE) whereas femtocell base stations are also denoted as Home evolved NodeB (HeNB). As implied by the name, a femtocell is typically significantly smaller than a macrocell.

There are two major access control options for co-channel femtocell networks. A first option is an open access femtocell that will allow any macro mobile station to join. Co-channel interference may thus be alleviated in an open access femtocell in that any mobile station within range of a femtocell's base station may join the femtocell. However, open access femtocells may then be burdened with a relatively large number of mobile stations, which will degrade the average bandwidth available per femtocell user. Accordingly, another option is a closed subscriber group (CSG) femtocell in which only authorized mobile stations may join. Although a CSG femtocell will thus preserve bandwidth for its users, significant interference from nearby macro mobile stations can arise in that these nearby mobile stations may be excluded from the CSG. In contrast, such nearby mobile stations could simply join the femtocell if it were open access. For this reason, open access mode generally yields better overall system throughput and coverage whereas CSG femtocells have larger capacity gains. However, open access operation raises privacy issues and burdens the femtocell owner's backhaul. Thus, co-channel interference (CCI) raised by CSG operation is an issue for what would otherwise be a desirable alternative to open access operation.

Two dominant CCI scenarios occur when there are macrocell mobile stations in the vicinity of a CSG femtocell. A first CCI scenario arises when a downlink femtocell base station (HeNB) transmission interferes with a downlink macrocell base station transmission to a macrocell mobile station in the vicinity of the HeNB. Similarly, a second CCI scenario arises when a macrocell mobile station's uplink transmission interferes with uplink transmissions in a nearby femtocell. Because significant CCI may result in outages at femtocells during the uplink, and for at macrocells during the downlink, CCI should be detected and prevented.

While several inter-cell interference avoidance techniques (ICIA) have been proposed to mitigate CCI in CSG type femtocell networks, they all have some drawbacks. For example, a number of 3GPP techniques use a specialized X2 interface to exchange information between macrocells and femtocells to coordinate allocation of spectrum resources between them. However, the X2 interface is only available for the macrocell base station and not for the femtocell base station in the current release of 3GPP. In addition, even if such an X2 interface is available, it is costly to implement. Another approach relies on macrocell mobile stations that are in close proximity to femtocells to relay coordination messages between macrocell and femtocell base stations. Even though this approach does not require the X2 interface, it requires extra signaling overhead and thus reduces availability of communication resources. Yet another approach uses a dedicated component carrier for use by macrocell mobile stations that are close to a femtocell. The drawback of this approach is that the component carrier is used regardless of whether there is interfering UE close to the femtocell or not. Accordingly, there is a need for a cost-effective distributed ICIA approach that allows for efficient utilization of the communication resources without requiring the use of any X2-like interface, messaging overhead, or dedicated component carriers.

SUMMARY

Systems and methods are provided for an ICIA technique for femtocell networks that allocate spectrum resources by relying on accurate sensing of the spectrum at an UE and a HeNB and by taking into account a coupling of the downlink (DL) and uplink (UL) scheduling decisions of the macrocell. At the macrocell side, the UE connected to an eNB senses the DL spectrum and detects whether there are any interfering femtocells in the vicinity. If there are any interfering femtocells, the eNB appropriately reschedules the DL spectrum resources utilized by the UE. Due to the coupling between the DL and UL scheduling decisions of the macrocell, the eNB also reschedules the UL spectrum resources for the UE based on the rescheduled DL spectrum.

After the DL/UL spectrum resources are rescheduled for the UE, the HeNB senses the UL spectrum from FUEs connected to the HeNB and detects whether there are any interfering UEs in the vicinity. If there are any interfering UEs, the HeNB releases the UL spectrum resources utilized by these UEs from use by the FUEs, giving priority for use of the spectrum resources to the UEs and eNB of the macrocell. The HeNB also obtains the DL spectrum resources used by the UEs based on knowledge of the coupling between the macrocell DL and UL scheduling decisions. The HeNB then reschedules the DL spectrum resources for the FUEs so as to avoid using these DL spectrum resources used by the UEs.

In accordance with one or more embodiments of the present disclosure, a method for interference avoidance between a first cellular network and a second cellular network sharing DL resources and UL resources is disclosed. The method includes sensing spectrum DL interference at a mobile station of the first cellular network. The method also includes re-scheduling UL and DL spectrum resources for the mobile station of the first cellular network to address the interference. The method further includes sensing a change in UL interference at a base station of the second cellular network as a result of the re-scheduling of UL resources for the mobile station of the first cellular network. The method further includes re-scheduling UL and DL spectrum resources for a mobile station of the second cellular network to address the change in UL interference.

In accordance with one or more embodiments of the present disclosure, an apparatus for inter-cell interference avoidance is disclosed. The apparatus includes a DL spectrum sensing module of a first cellular network used to detect DL interference. The apparatus also includes a re-scheduler module of the first cellular network. The re-scheduler module is used to re-schedule UL and DL spectrum resources of the first cellular network to address the interference. The apparatus further includes an UL spectrum sensing module of a second cellular network. The UL spectrum sensing module is used to detect a change in UL interference as a result of the re-scheduling of the UL resources for the first cellular network. The apparatus further includes a re-scheduler module of the second cellular network used to re-schedule UL and DL spectrum resources of the second cellular network to address the interference.

In accordance with one or more embodiments of the present disclosure, an apparatus for inter-cell interference avoidance is disclosed. The apparatus includes an UL spectrum sensing module of a first cellular network used to detect a change in UL interference from a second cellular network. The apparatus also includes a re-scheduler module of the first cellular network. The re-scheduler module is used to re-schedule UL spectrum resources of the first cellular network to avoid using UL resources of the first cellular network sensed as receiving interference from the second cellular network. The re-scheduler module is also used to determine DL resources of the first cellular network expected to receive interference from the second cellular network. The re-scheduler module is further used to re-schedule DL resources of the first cellular network to avoid using the DL resources of the first cellular network expected to receive interference from the second cellular network.

In accordance with one or more embodiments of the present disclosure, a machine readable medium that includes non-transitory instructions for execution by a processor is disclosed. The instructions are executed by the processor to sense spectrum during UL of a first cellular network to detect a change in UL resources of the first cellular network receiving interference from a second cellular network. The instructions are also executed by the processor to re-schedule UL resources of the first cellular network to avoid using UL resources of the first cellular network sensed as receiving interference from the second cellular network. The instructions are further executed by the processor to determine DL resources of the first cellular network expected to receive interference from the second cellular network. The instructions are further executed by the processor to re-schedule DL resources of the first cellular network to avoid using the DL resources of the first cellular network expected to receive interference from the second cellular network.

DETAILED DESCRIPTION

Figure 1:
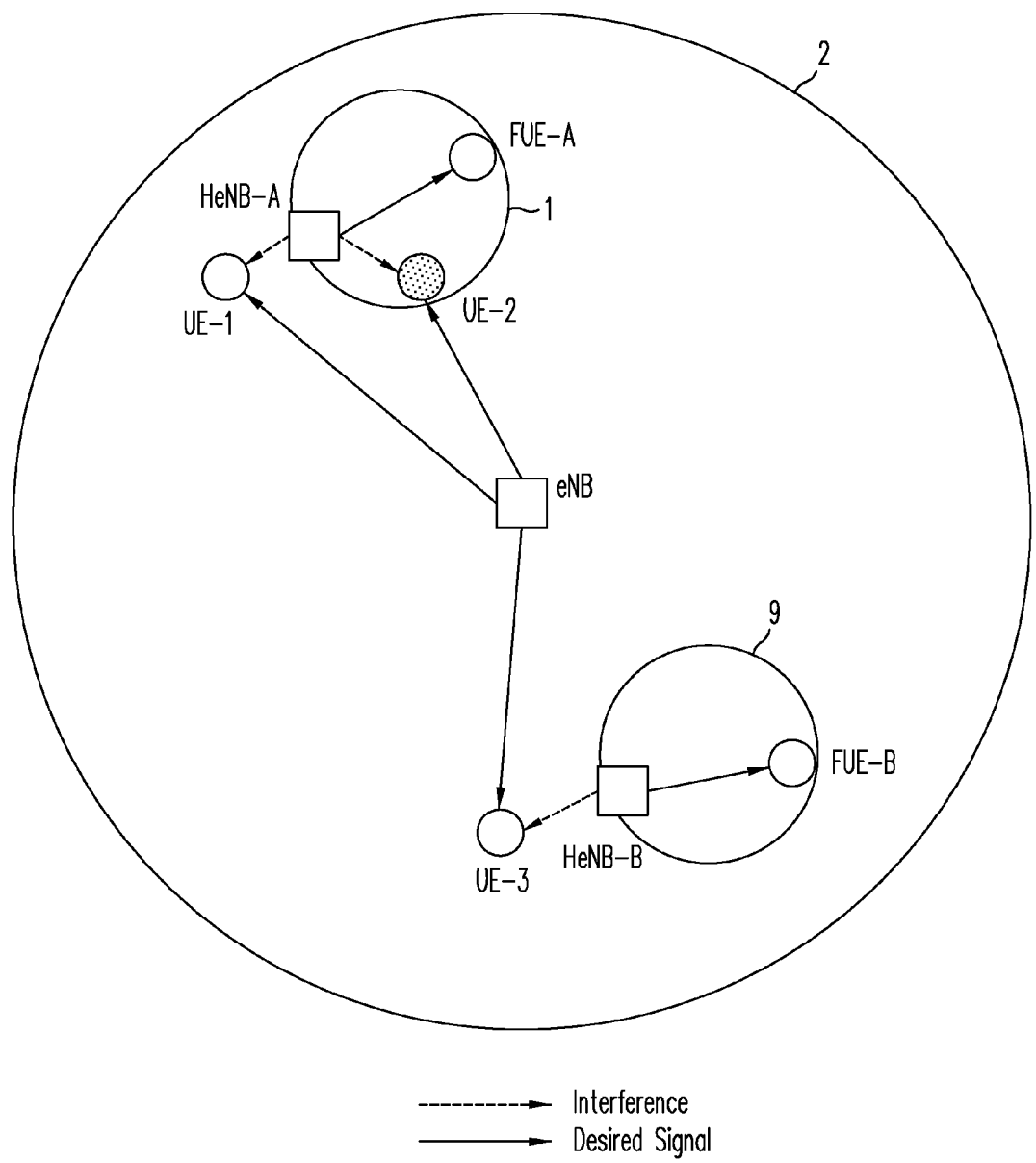
FIG. 1 shows co-channel femtocells interfering with DL transmission of a macrocell base station to macrocell mobile stations in the vicinity of the femtocells according to one or more embodiments of the present disclosure.

The downlink interference scenario discussed above may be better understood with reference with to FIG. 1. A macrocell 2 includes a macrocell base station (eNB) and three corresponding macrocell mobile stations (UE-1, UE-2, and UE-3). Two CSG-type femtocells 1 and 9 introduce co-channel interference (CCI) within macrocell 2. Femtocell 1 includes a femtocell base station (HeNB-A) and a corresponding femtocell mobile station (FUE-A). Similarly, femtocell 9 includes a femtocell base station (HeNB-B) and a corresponding femtocell mobile station (FUE-B). The interfering downlink transmissions are denoted by dotted arrows in FIG. 1 whereas the desired downlink transmissions are denoted by solid arrows. In that regard, note that macrocell mobile station UE-3 is relatively close to femtocell 9 whereas macrocell mobile stations UE-1 and UE-2 are relatively close to femtocell 1. Because these CSG-type femtocells are closed, these UEs suffer from co-channel interference from the nearby femtocell base stations. In particular, the downlink transmission from HeNB-B in femtocell 9 interferes with the downlink transmission from eNB to UE-3. Similarly, the downlink transmission from HeNB-A in macrocell 1 interferes with the downlink transmission from eNB to UE-1 and UE-2. In contrast, if femtocell 9 was open access, UE-3 could simply join this femtocell and avoid this co-channel interference. Similarly, if femtocell 1 were open access, UE-1 and UE-2 could join and also avoid this co-channel interference.

Figure 2:
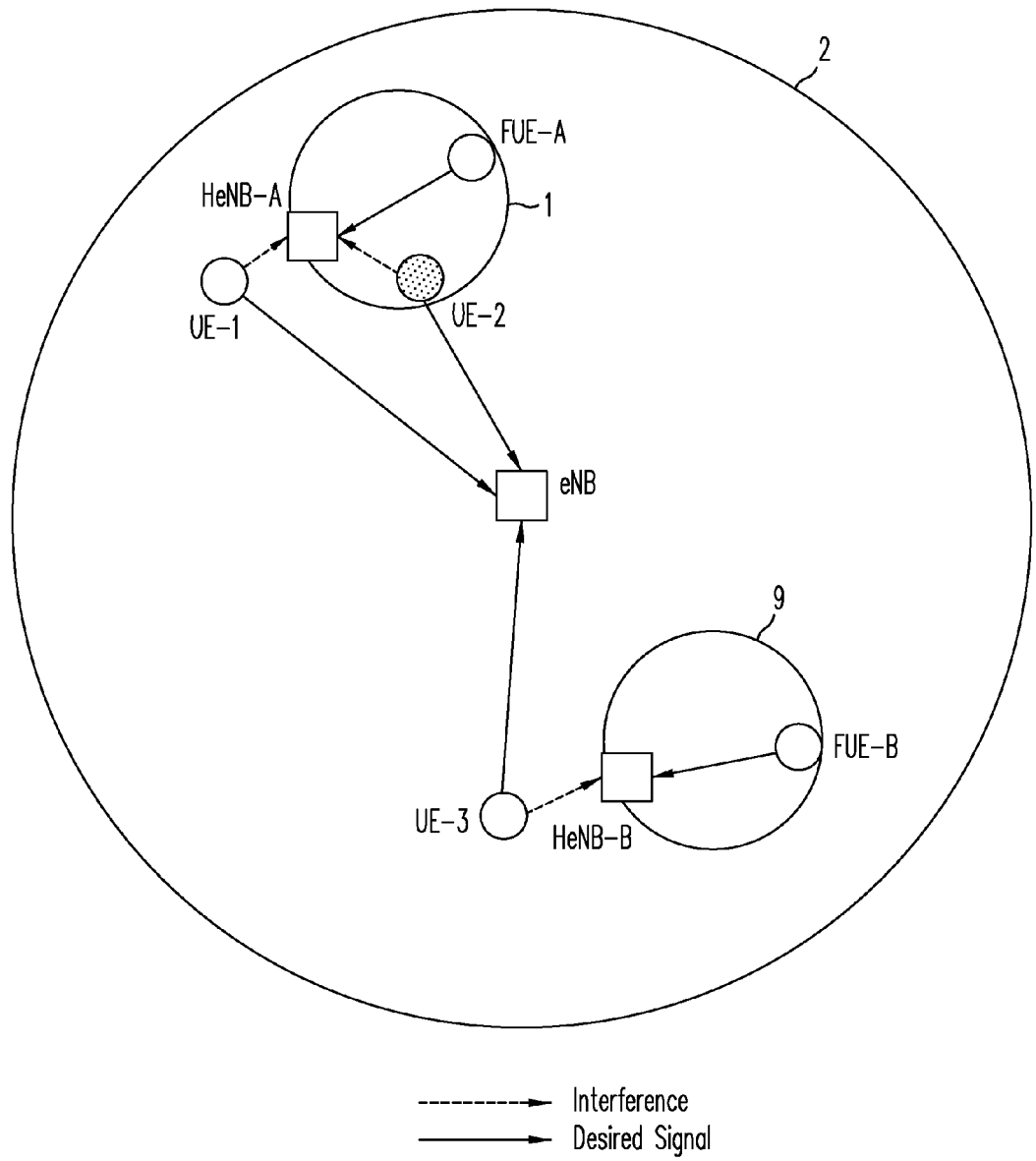
FIG. 2 shows macrocell mobile stations interfering with UL transmission of femtocell mobile stations to femtocell base stations in the vicinity of the macrocell mobile stations according to one or more embodiments of the present disclosure.

The same macrocell and femtocells are used in FIG. 2 to illustrate the uplink co-channel interference scenario. Because UE-3 is relatively close to femtocell 9, the uplink transmission from UE-3 interfere with femtocell 9 uplink transmissions to HeNB-B. Similarly, the uplink transmissions from UE-1 and UE-2 interfere with femtocell 1 uplink transmissions to HeNB-A. It may thus be observed that for both UL and DL, the entity causing the co-channel interference is the presence of a nearby macrocell mobile station to a femtocell. As discussed further herein, these interferences between the macrocell UEs and the femtocell base stations may be advantageously avoided by sensing the spectrum used by the macrocell UEs during the DL and UL. Such spectrum sensing may be performed separately by the macrocell UEs during the DL and by the femtocell base stations during the UL in a distributed manner.

Referring again to FIG. 1, UE-1 and UE-2 may sense downlink interference from HeNB-A whereas UE-3 may sense downlink interference from HeNB-B. For example, if any of these macrocell mobile stations detect downlink interference at some threshold power level above thermal noise, the detecting macrocell mobile station may determine that it is in the vicinity of an interfering femtocell base station. However, it is difficult for macrocell mobile stations to detect uplink interference since the UL transmissions from the femtocell mobile stations are so weak. This can be seen for UE-3, which is out of the detection range for uplink transmissions from FUE-B. Similarly, UE-1 is out of the detection range for uplink transmissions from FUE-A. It is only UE-2 that is sufficiently close to detect uplink transmissions from FUE-A. Therefore, UL interference detection may be performed by femtocell base stations.

For example, during the UL, HeNB-A may sense interference from nearby UE-1 and UE-2 by detecting resource blocks such as sub-bands utilized by UE-1 and UE-2 during UL. On the other hand, femtocell base stations such as HeNB-A can not easily learn the DL resource allocations for nearby macrocell mobile stations such as UE-1 and UE-2 because DL resource blocks from the eNB are used for DL transmission to all the macrocell UEs, including to macrocell mobile station UE-3 that does not cause interference to HeNB-A. Thus, it is very difficult for femtocell base stations such as HeNB-A to learn the DL resource allocation information of nearby macrocell mobile stations such as UE-1 and UE-2. Advantageously, DL interference detection is thus performed by macrocell UEs during the DL as discussed further herein.

Scheduling decisions for the DL and the UL are typically independent for the macrocell UEs. The amount of DL and UL spectrum used by the UEs in the macrocell may also be different. Similarly, scheduling decisions for the DL and the UL are typically independent for the femtocell UEs. Therefore, even with perfect spectrum sensing by HeNBs during the UL and by UEs during the DL, HeNBs will not be aware of DL resources used by adjacent macrocell mobile stations, and macrocell base stations will not be aware of UL resources used by femtocell mobile stations.

To enable ICIA in a distributed manner at the femtocell and at the macrocell, the present disclosure gives higher priority to mitigating co-channel interference produced by the femtocell on the macrocell users as opposed to mitigating co-channel interference produced by the macrocell users on the femtocell. In this fashion, femtocell users should not significantly degrade the capacity of macrocell users. One reason for this higher priority given to the macrocell users is that femtocells typically have larger spectrum resources for each connected femtocell mobile station than the spectrum resources available for each macrocell mobile station. To ensure that femtocell mobile stations do not significantly degrade the capacity of macrocell mobile stations, the macrocell mobile stations may have priority for access to the spectrum resources. To provide this priority, femtocells should release certain co-channel spectrum resources used by femtocell mobile stations whenever it is needed.

In addition, the DL and UL scheduling decisions are coupled through a mapping function at the macrocell when an interfering femtocell is detected. This DL/UL coupling is maintained as long as the interference conditions persist. This mapping function may also be stored at the femtocells so that once HeNBs sense the UL spectrum from nearby macrocell UEs, HeNBs may use the mapping function to learn about the DL resources used by the macrocell UEs. There are two major embodiments of the distributed ICIA method with DL/UL coupling disclosed herein: a carrier-aggregation based approach, and a resource partitioning based approach. While the second approach is discussed in the context of frequency partitioning, the same general concept may be easily applied to partitioning resources in time.

Figure 3:
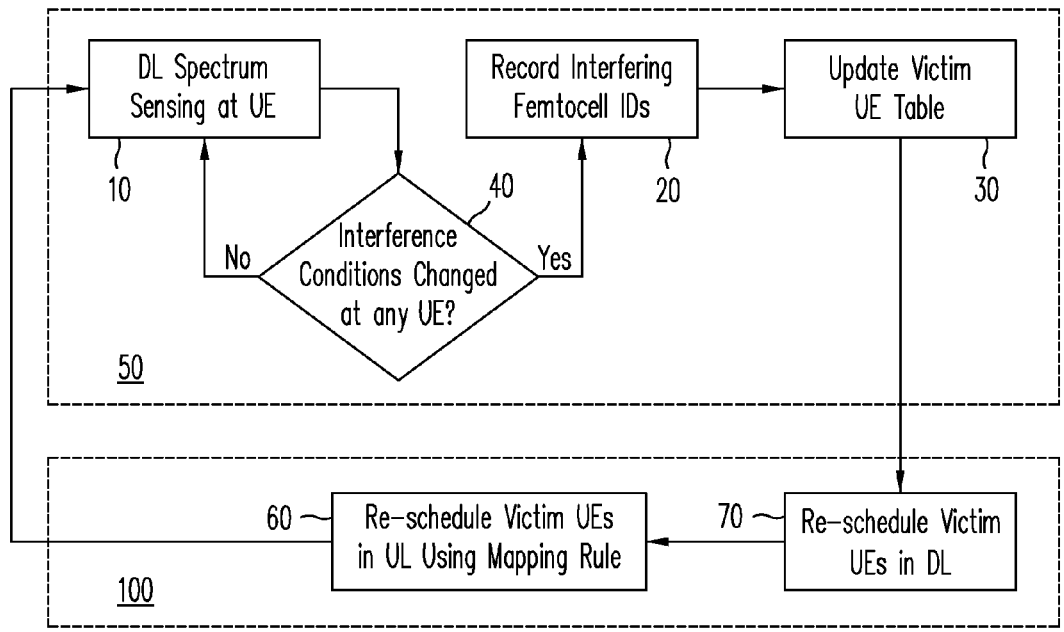
FIG. 3 shows a flowchart of the ICIA method at a macrocell for rescheduling DL/UL spectrum resources used by macrocell mobile stations encountering interference from femtocells according to one or more embodiments of the present disclosure.
Figure 4:
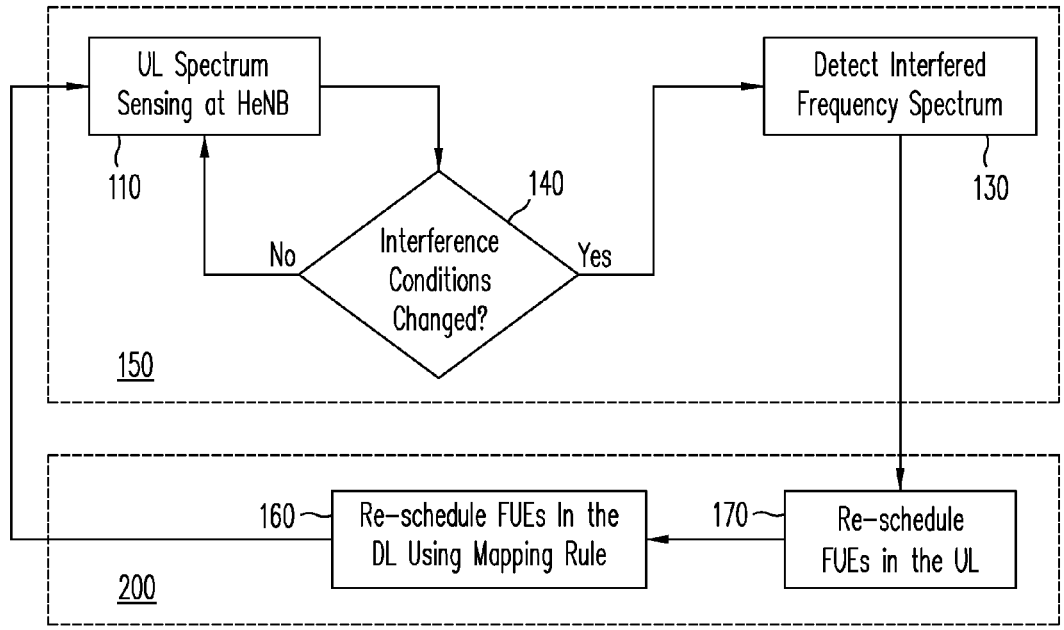
FIG. 4 shows a flowchart of the ICIA method at a femtocell for rescheduling DL/UL spectrum resources used by femtocell mobile stations when the femtocell encounters interference from macrocell mobile stations according to one or more embodiments of the present disclosure.

These two approaches may be better understood with reference to FIGS. 3 and 4. FIG. 3 shows a flowchart of the ICIA method at a macrocell for rescheduling DL/UL spectrum resources used by macrocell mobile stations encountering interference from femtocells according to one or more embodiments of the present disclosure. FIG. 4 shows a flowchart of the ICIA method at a femtocell for rescheduling DL/UL spectrum resources used by femtocell mobile stations when the femtocell encounters interference from macrocell mobile stations according to one or more embodiments of the present disclosure. FIG. 3 thus shows the macrocell ICIA acts whereas FIG. 4 shows the corresponding femtocell acts.

As discussed above, a priority is given to the macrocell having corresponding access to spectrum resources to mitigate interference. In that regard, one can readily appreciate that either the femtocell or the macrocell should be given priority—if both have equal priority, an unstable oscillating allocation of spectrum resources may result. For example, certain "victim" macrocell mobile stations may determine that they are experiencing downlink interference from femtocells such that the DL and UL spectrum resources for the victim mobile stations are re-scheduled accordingly. But if the femtocells have equal priority, the femtocell base stations may have been detecting UL interference from neighboring macrocell mobile stations at approximately the same time that the DL interference was detected by the victim mobile stations. The femtocell base stations may then be re-scheduling their UL and DL transmissions accordingly. In this fashion, the re-scheduling at both the femtocell and the macrocell level could conflict such that the victim macrocell mobile stations could have their UL and DL continually changed in response to ongoing shifts at the femtocell level and vice versa such that the UL and DL re-scheduling at the macrocell and femtocell levels would "see-saw" with respect to each other yet never resolve the interference.

To resolve this conflict, an initial main step 50 of FIG. 3 identifies "victim" macrocell mobile stations that are experiencing interference from adjacent femtocells. Given this identification, the macrocell base station adjusts the DL and UL transmissions for its victim macrocell mobile stations in step 100. FIG. 4 illustrates a reaction to this adjustment in that an initial main step 150 identifies not merely UL interference at the femtocell base stations but instead a change in the UL interference. In other words, there must be UL interference and then a change in this interference for the identification of step 150. Given this identified change, the femtocell base station re-schedules the UL and DL transmissions for its femtocell mobile stations accordingly in final step 200.

Note that the re-scheduling in the macrocell occurs only with regard to the victim macrocell mobile stations—unaffected macrocell mobile stations may have unfettered access to the spectrum resources. In contrast, the femtocell re-scheduling occurs with regard to the entire femtocell community. Since the femtocell re-scheduling is responsive to the macrocell re-scheduling, the priority is clear: the femtocell re-scheduling can only accommodate whatever leftover spectrum resources are available after the macrocell makes its re-scheduling. It will be appreciated, however, that FIGS. 3 and 4 are readily modified to reverse the priority order. In other words, the femtocell re-scheduling could occur as discussed with regard to FIG. 3 such that the macrocell re-scheduling would only occur responsive to interference changes induced by the femtocell re-scheduling. However, it will be assumed without loss of generality in the following discussion that the macrocell is given priority. The carrier aggregation will be first discussed with regard to FIG. 3 and FIG. 4.

Carrier Aggregation

Figure 5:
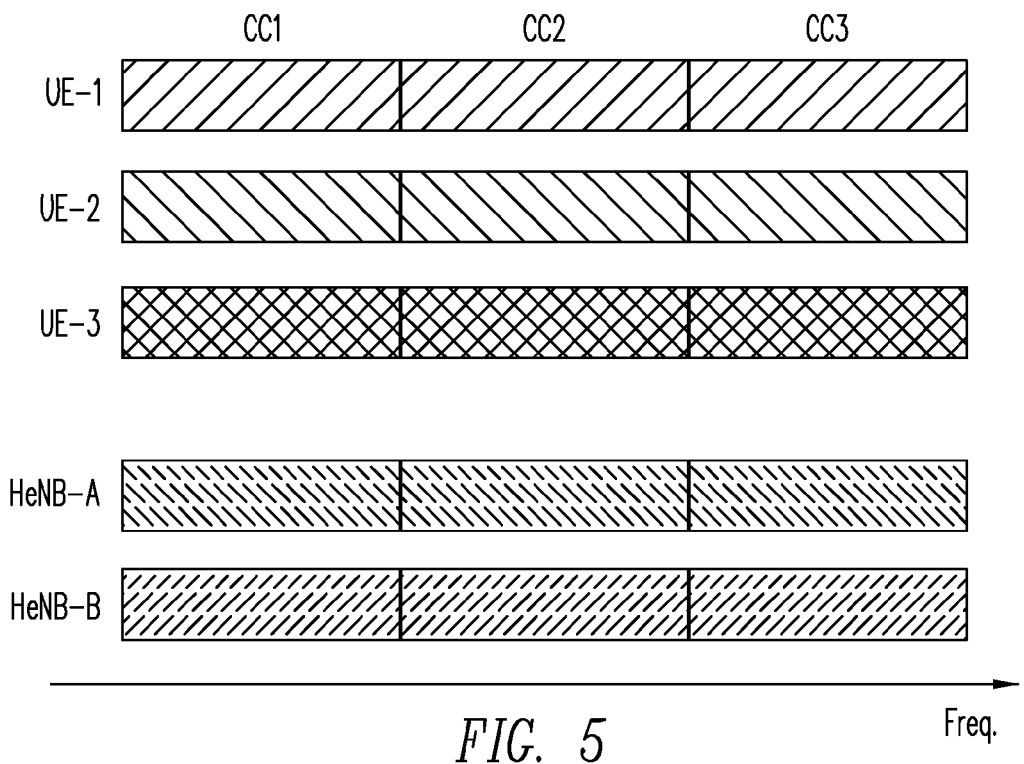
FIG. 5 shows an allocation of component carriers for the macrocell mobile stations and femtocells of FIGS. 1 and 2 before use of a carrier aggregation approach of the ICIA method of FIGS. 3 and 4 according to one or more embodiments of the present disclosure.

An example scenario for the carrier aggregation approach is shown in FIG. 5, which illustrates a pre-existing allocation of component carriers for the macrocell mobile stations and femtocells of FIGS. 1 and 2 prior to detection of co-channel interference. In this example, there are three component carriers (CCs) designated as CC1, CC2, and CC3 that may be utilized by the UEs of the macrocell and FUEs of the femtocell. Note that even though FIG. 5 shows the UL and DL as using the "same" component carriers, the CCs for DL and UL use may be allocated to different frequencies of the spectrum. For example, the CCs for UL may occupy different parts of the spectrum from the CCs for DL. In this respect, the CCs for DL and UL may represent frequency indices or frequency offsets from a starting frequency allocation for the DL, and from a different starting frequency allocation for the UL, respectively. To take advantage of multiuser diversity, the eNB may schedule macrocell mobile stations UE-1, UE-2, and UE-3 within any of these component carriers based on the channel qualities and rate requirements. Similarly, femtocell base stations HeNB-A and HeNB-B may schedule their femtocell mobile stations FUE-A and FUE-B within any of these component carriers based on the channel qualities and rate requirements. Moreover, if peak rates are required, all of the component carriers may be assigned to a single user.

Referring now to FIGS. 3 and 4, the X2-free ICIA mechanism includes four main steps. The first two steps (illustrated in FIG. 3) are performed by macrocell components whereas the last two steps (illustrated in FIG. 4) are performed by femtocell components. In a first step 50, the macrocell mobile station detects and identifies interfering femtocells to its macrocell base station. As seen in FIG. 3, step 50 comprises steps 10, 20, 40, and 30. In step 10, the macrocell mobile station senses the DL spectrum to detect interference from nearby femtocell base stations. At step 40, the macrocell mobile station determines if interference conditions have changed such that step 10 is repeated if there are no changes detected. If interference conditions have changed, the macrocell mobile station records identification information for the interfering femtocell and transmits this identification information to its macrocell base station. The macrocell base station may then make a table of victim macrocell mobile stations corresponding to each identified femtocell at step 30. For example, for the macrocell and femtocells of FIG. 1 and FIG. 2, the eNB may generate the following interference table:

TABLE 1

Interference table capturing the IDs of femtocells that are interfering to each UE.

| Femtocell | Interfered UE |
|---|---|
| HeNB-A | UE-1, UE-2 |
| HeNB-B | UE-3 |

Figure 6:
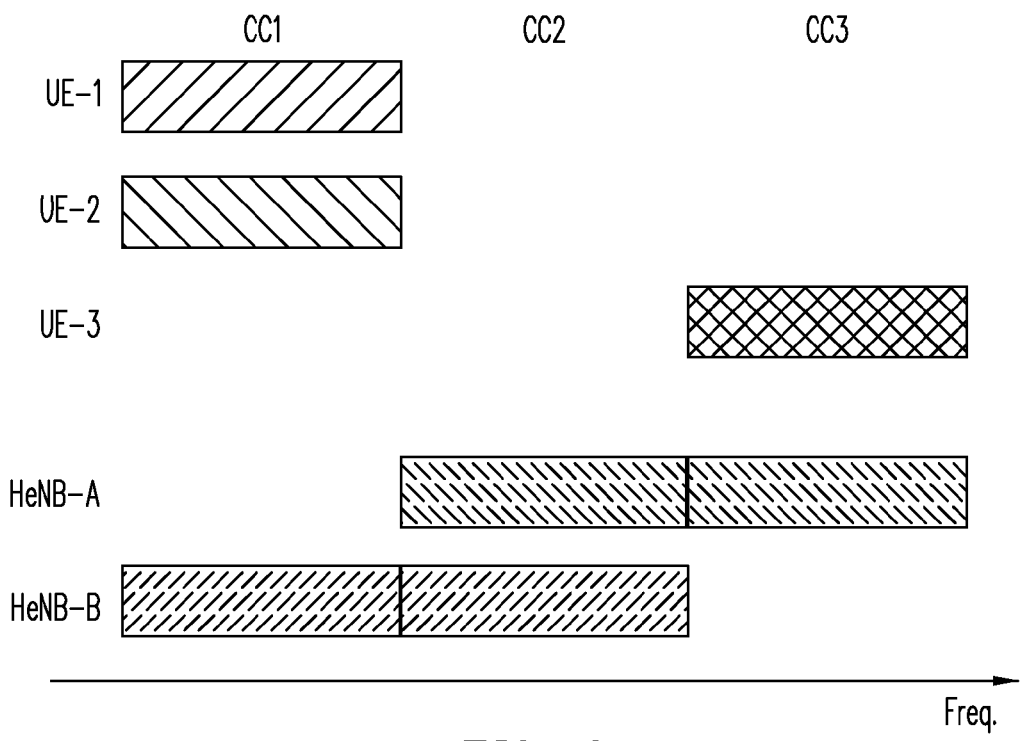
FIG. 6 shows an allocation of component carriers for the macrocell mobile stations and femtocells of FIGS. 1 and 2 after use of a carrier aggregation approach of the ICIA method of FIGS. 3 and 4 according to one or more embodiments of the present disclosure.

In a second step 100, the macrocell base station re-allocates the UL and DL spectral resources for its mobile stations based upon the identified victim mobile stations in step 50. This second step 100 includes steps 70 and 60. At step 70, the macrocell base station may re-schedule all the UEs which are in the vicinity of an interfering femtocell to use a single component carrier for DL, or alternatively a pre-determined number of component carriers. FIG. 6 shows an allocation of component carriers for the macrocell mobile stations and femtocells of FIGS. 1 and 2 after use of the carrier aggregation approach of the ICIA method of FIGS. 3 and 4 according to one or more embodiments of the present disclosure. If each macrocell mobile station has a nominal DL bandwidth requirement of one component carrier selected from the carriers of FIG. 5, the eNB could assigns UE-1 and UE-2 to the same component carrier CC1 of the DL frequency allocation and could assign UE-3 to a different component carrier CC3 of the DL frequency allocation. This way, the eNB may still dedicate sufficient DL bandwidth to meet the requirements of macrocell users. However, since a narrower total bandwidth is available for scheduling decisions for each macrocell user, multiuser diversity gain may be diminished.

Referring back to FIG. 3, at step 60, the macrocell base station may use a DL/UL mapping function to re-schedule UL component carriers for those UEs whose DL component carriers were re-scheduled at step 70. For the embodiment of FIG. 6, the eNB uses the DL/UL mapping function to assign for UL those component carriers that correspond to the component carriers assigned for DL. Therefore, the re-scheduled UL CCs are offset from an UL starting frequency by the same amount as the offset of the re-scheduled DL CCs from a DL starting frequency. The mapping function is simply the identity function in such a case. Thus, UE-1 and UE-2 would use CC1 of the UL frequency allocation for their UL transmissions whereas UE-3 would use CC3 of the UL frequency allocation. Alternatively, the DL transmissions may be mapped to component carriers that are offset from a DL starting frequency by different offsets than those of the component carriers used for UL from an UL starting frequency, so long as the mapping function is also known by the femtocell base stations. In this fashion, when the femtocell base stations sense the UL spectrum and detect interfering UEs, the femtocells will know which component carriers these macrocell mobile stations will be using in the DL. This coupling of DL/UL transmissions of UEs and the re-scheduling of component carriers are only performed for those UEs that receive significant interference from a femtocell. For those UEs which are not interfered by the femtocell, scheduling of the component carriers may be performed in a conventional way, such as allowing these UEs to use all available resources.

The final two steps of the carrier aggregation ICIA is shown in FIG. 4 with regard to femtocell sensing and scheduling. In a third step 150, the femtocell base station detects and identifies UL interference from nearby macrocell mobile stations. Third step 150 includes steps 110, 140, and 130. At step 110, the femtocell base station senses the UL spectrum to detect interference from nearby macrocell mobile stations. At step 140, the femtocell base station determines if interference conditions have changed such that step 110 is repeated if no changes are detected. If interference conditions have changed, at step 130 the femtocell base station identifies the frequency spectrum that is receiving the interference.

In a fourth step 200, the femtocell base station may schedule its femtocell mobile station spectral allocations based upon the identified interference from step 150 and the mapping function of FIG. 3. The fourth step 200 includes steps 170 and 160. In step 170, the femtocell base station re-schedules the UL spectral allocations for its femtocell mobile stations based upon any interfering UL transmissions detected in step 130. For example, HeNB-A of FIGS. 1 and 2 may detect strong interference at component carrier CC1 for a pre-determined period of time during the UL from FUE-A. HeNB-A may then determine that there are UEs within its coverage, and that scheduling decisions of the macrocells will constrain these UEs to use component carrier CC1 for a relatively long duration. At step 170, the femtocell base station may re-schedule the UL for all its femtocell mobile stations to avoid using CC1 as long as the interference condition persists. For example, FIG. 6 shows HeNB-A re-scheduling UL of FUE-A to use components carriers CC2 and CC3 of the UL frequency allocation. Similarly, HeNB-B may detect strong interference at component carrier CC3 and re-schedules UL of FUE-B to use component carriers CC1 and CC2 of the UL frequency allocation.

Referring back to FIG. 4, at step 160, the femtocell base station utilizes the DL/UL mapping function used by the macrocell base station to schedule its UE DL/UL spectrum resources to re-schedule DL component carriers for all its femtocell mobile stations. Based on the UL sensing results in step 130, the femtocell base station uses the DL/UL mapping function to determine the DL component carriers used or expected to be used by interfering macrocell mobile stations so as to avoid using these same DL component carriers during femtocell downlink. For example, the DL/UL mapping function for UEs of FIG. 6 assigns the component carriers for UL corresponding to the component carriers used for DL. Therefore, UL CCs for the interfering UEs are offset from an UL starting frequency by the same amount as the offset of the DL CCs from a DL starting frequency. In other words, the mapping function is the identity function. From the DL/UL mapping function, femtocell base stations HeNB-A determines that interfering macrocell mobile stations UE-1 and UE-2 are expected to use CC1 of the DL frequency allocation. Similarly, femtocell base stations HeNB-B determines that interfering macrocell mobile station UE-3 is expected to use CC3 of the DL frequency allocation. Therefore, HeNB-A re-schedules FUE-A to also use components carriers CC2 and CC3 of the DL frequency allocation for DL to avoid using component carrier CC1 used by UE-1 and UE-2. Similarly, HeNB-B re-schedules FUE-B to use component carriers CC1 and CC2 of the DL frequency allocation for DL to avoid using component carrier CC3 used by UE-3.

Resource Partitioning

The resource partitioning based approach will next be discussed. In the resource partitioning based approach, resource blocks for DL and UL may be partitioned based on frequency, time, or both. Compared to the component carriers of the carrier aggregation based approach, the granularity of the resource blocks in the resource partitioning based approach is finer. In particular, ICIA may take a single component carrier and partition it into smaller resource blocks in frequency or time for the resource partitioning based approach.

Figure 7:
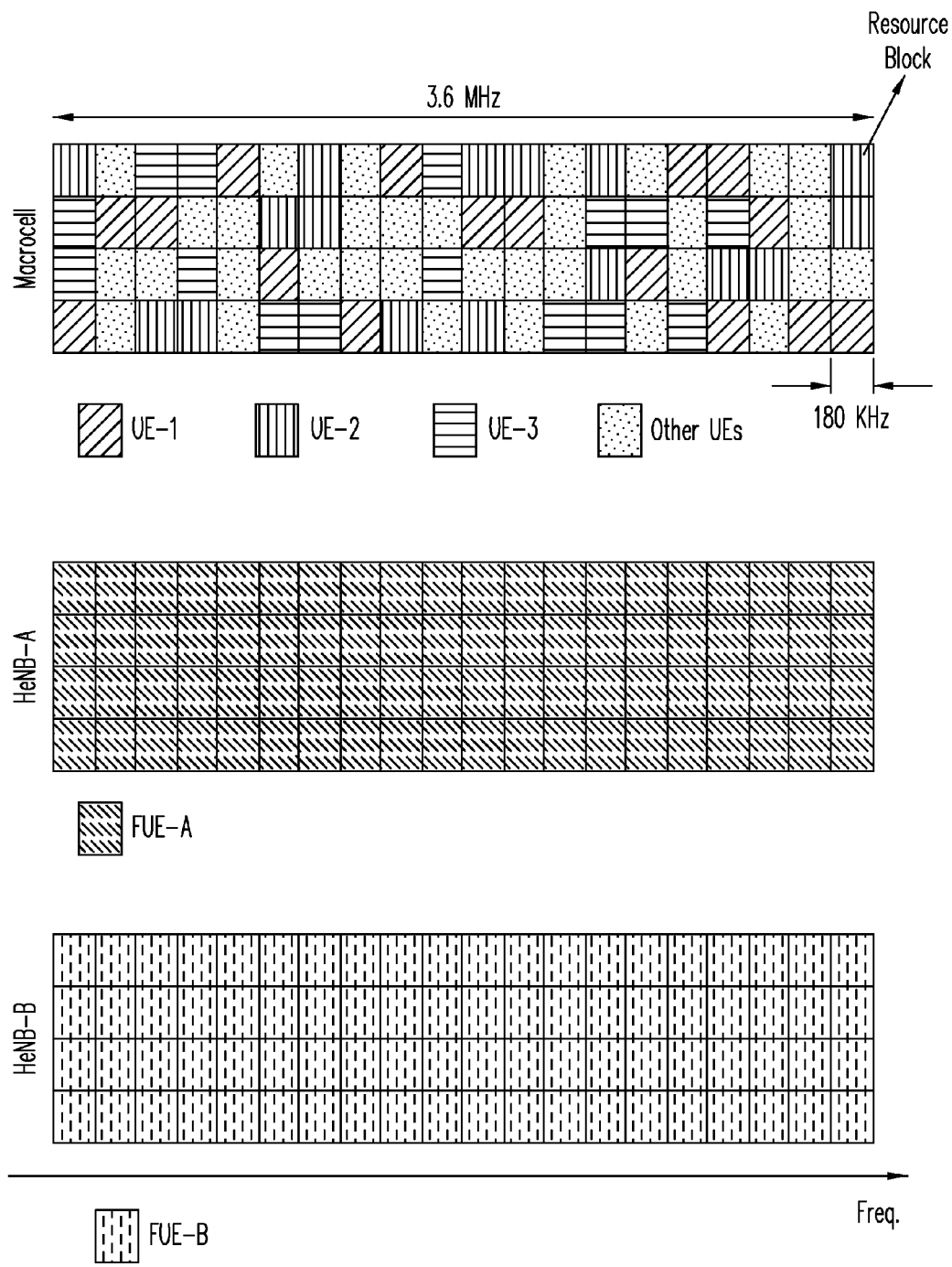
FIG. 7 shows an allocation of DL resource blocks for the macrocell mobile stations and femtocells of FIG. 1 before use of a resource partitioning approach of the ICIA method of FIGS. 3 and 4 according to one or more embodiments of the present disclosure.
Figure 8:
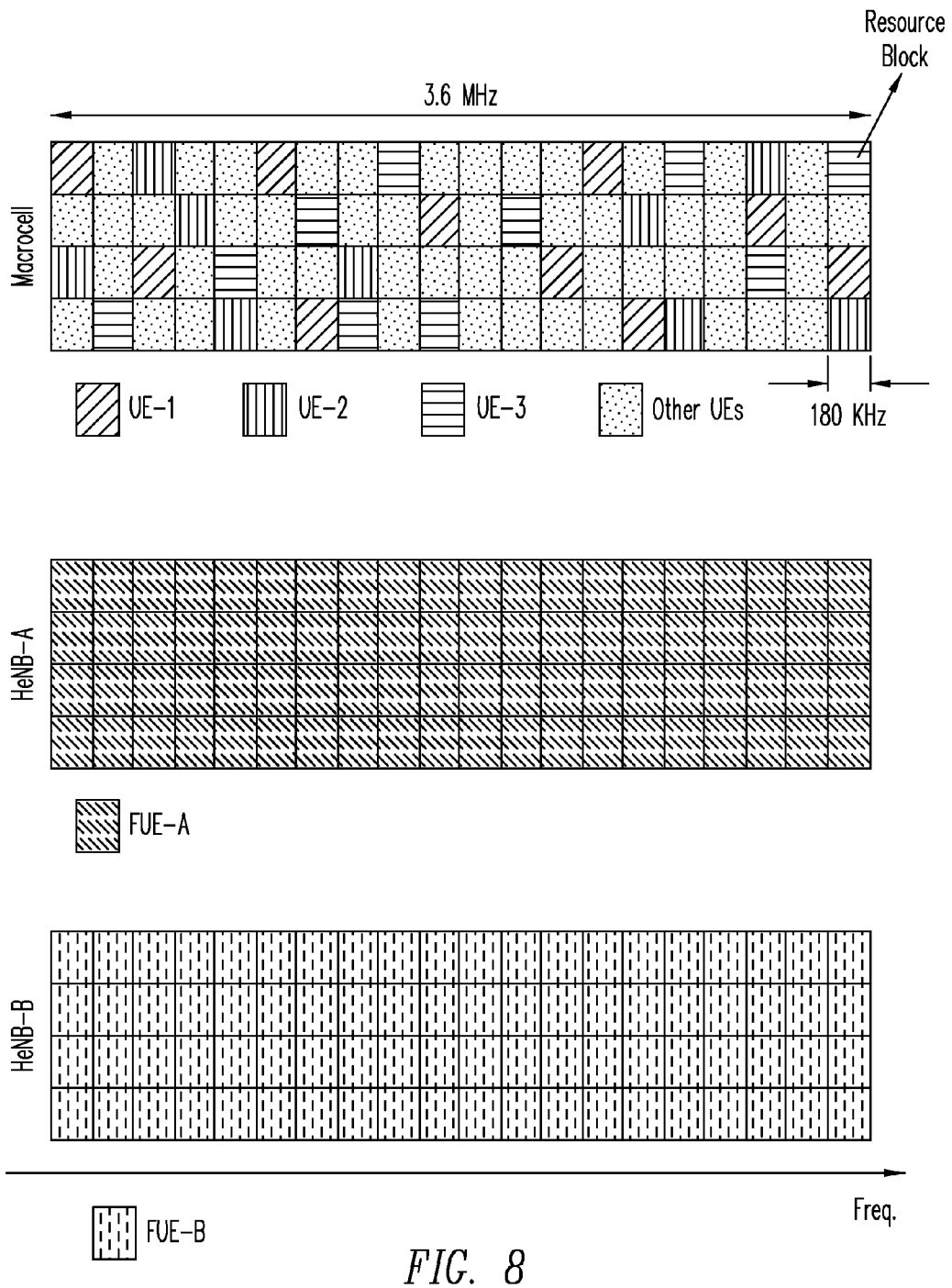
FIG. 8 shows an allocation of UL resource blocks for the macrocell mobile stations and femtocells of FIG. 1 before use of a resource partitioning approach of the ICIA method of FIGS. 3 and 4 according to one or more embodiments of the present disclosure.

An example scenario for the resource partitioning based approach is shown in FIG. 7 and FIG. 8. FIG. 7 illustrates a pre-existing allocation of DL resource blocks for the macrocell mobile stations and femtocells of FIGS. 1 and 2 prior to detection of co-channel interference. Similarly, FIG. 8 illustrates a pre-existing allocation of UL resource blocks for the macrocell mobile stations and femtocells of FIGS. 1 and 2 prior to detection of co-channel interference. The resource allocations in the DL and UL are made independently. In the example, there are 3.6 MHz of available spectrum that is partitioned into 20 frequency slices of 180 KHz each. Each 180 KHz frequency slice may be further sliced into four resource blocks in units of subcarriers. Alternatively, each 180 KHz slice may be partitioned along another dimension of access, such as in the time domain. A total of 80 resource blocks are shown as available for use by the macrocells and femtocells. It is also shown that there are 16 resource blocks utilized per macrocell UE in the DL, while 10 resource blocks are utilized per macrocell user in the UL. On the other hand, femtocell FUE fully uses the entire 80 resource blocks for both DL and UL. Similar to the CCs of the carrier aggregation approach, the UL resource blocks of the resource partitioning approach may occupy different parts of the spectrum from the DL resource blocks. In this respect, the resource blocks for DL and UL may represent block indices or block offsets from a starting resource block allocation for the DL, and from a different starting resource block allocation for the UL, respectively.

Referring back to FIG. 3 and FIG. 4, in steps 50, the macrocell mobile station detects and identifies interfering femtocells to its macrocell base station as in the carrier aggregation based approach. For example, macrocell users UE-1, UE-2 may identify interfering femtocell HeNB-A in the DL, and macrocell user UE-3 may identify interfering femtocell HeNB-B in the DL. Also, as before, the macrocell base station eNB may generate the interference table of Table 1 for associating the victim macrocell mobile stations with their corresponding identified femtocells.

Figure 9:
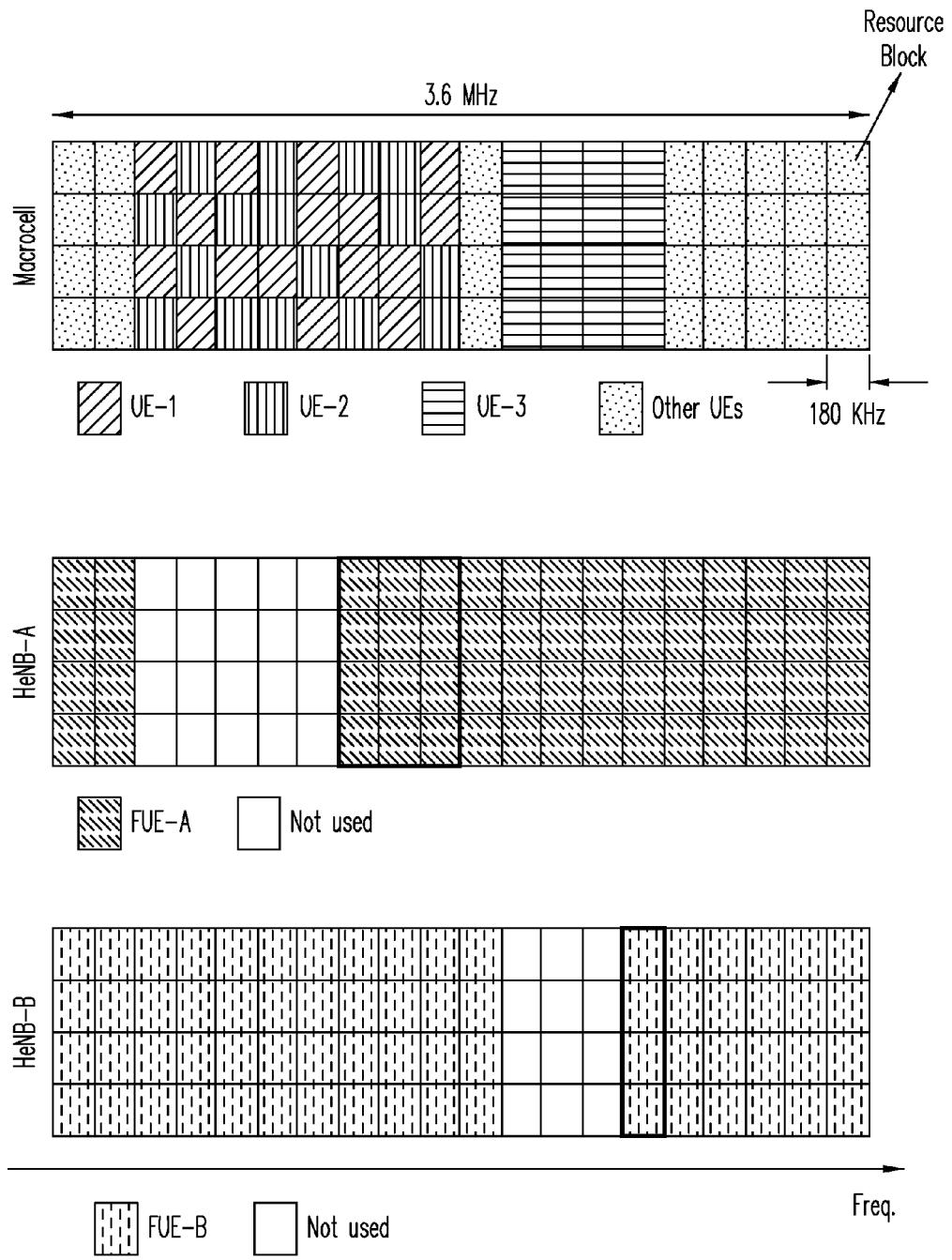
FIG. 9 shows an allocation of DL resource blocks for the macrocell mobile stations and femtocells of FIG. 1 after use of a resource partitioning approach of the ICIA method of FIGS. 3 and 4 according to one or more embodiments of the present disclosure.

At step 100, the macrocell base station re-allocates the UL and DL resource blocks for its mobile stations based upon the identified victim mobile stations from step 50. For example, for any UE that receives significant DL interference from a femtocell based on the interference table, the eNB re-schedules DL resource blocks for the UE to mitigate the interference. FIG. 9 shows an allocation of DL resource blocks for the macrocell mobile stations and femtocells of FIG. 1 after use of a resource partitioning approach of the ICIA method of FIGS. 3 and 4 according to one or more embodiments of the present disclosure. As shown, macrocell base station eNB re-schedules macrocell mobile stations UE-1, UE-2 that are in the vicinity of femtocell base station HeNB-A to use resource blocks encompassing a frequency range of 1.44 MHz for DL. Macrocell mobile stations UE-3 that is in the vicinity of femtocell base station HeNB-B is also re-scheduled to use resource blocks encompassing a frequency range of 0.72 MHz in another part of the spectrum for DL. As shown, after the DL re-scheduling, the eNB has allocated the same amount of 16 resource blocks to each macrocell users UE-1, UE-2, and UE-3 for DL as before the re-scheduling. However, since a narrower total bandwidth is available for scheduling decisions, multiuser diversity gain may be diminished.

Figure 10:
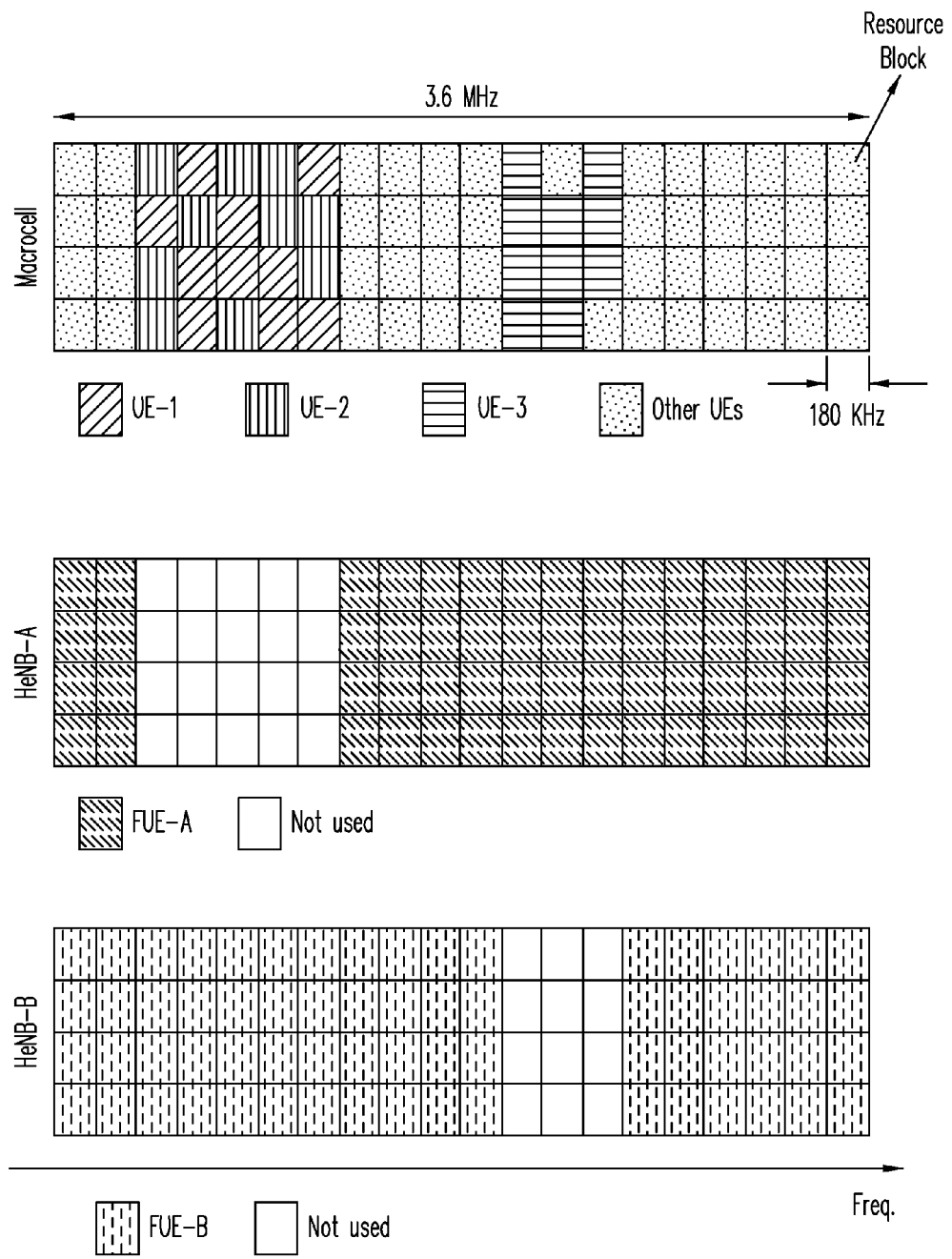
FIG. 10 shows an allocation of UL resource blocks for the macrocell mobile stations and femtocells of FIG. 1 after use of a resource partitioning approach of the ICIA method of FIGS. 3 and 4 according to one or more embodiments of the present disclosure.

Referring back to FIG. 3, at step 60, the eNB re-schedules UL resource blocks so that they are a known mapping of the DL resource blocks used by the UEs. For example, the mapping function in the resource partitioning approach may map the first resource block of the re-scheduled DL resource blocks to the first resource block of the UL resource blocks to be re-scheduled for UL use by UEs. FIG. 10 shows an allocation of UL resource blocks for the macrocell mobile stations and femtocells of FIG. 1 after use of a resource partitioning approach of the ICIA method of FIGS. 3 and 4 according to one or more embodiments of the present disclosure. As shown, macrocell eNB 6 has allocated the same amount of 10 resource blocks to each of macrocell users UE-1, UE-2, and UE-3 for UL as before the re-scheduling. In this embodiment of the DL/UL mapping function, the first DL resource blocks of the resource partitioning for UE-1, UE-2 are offset from the first DL resource block available in the spectrum by the same amount as the offset of the first UL resource blocks for UE-1, UE-2 from the first UL resource block available in the spectrum. For DL, UE-1 and UE-2 is each allocated 16 resource blocks from this first DL resource block, while for UL, UE-1 and UE-2 is each allocated 10 resource blocks from this first UL resource block. Alternatively, in other embodiments, more complex DL/UL mapping functions may be used. Note that in the resource partitioning approach, the number of resource blocks allocated for DL and UL may dynamically change as a function of changing resource requirements of the UEs. In that case, even though the DL/UL mapping function may be used by the femtocells to determine the first DL resource block used by the interfering UEs from the first UL resource block used by the interfering UEs, the femtocells may not know the number of resource blocks allocated for DL use by the UEs. Therefore, when the femtocells sense the UL spectrum and detect interfering UEs, the femtocells may not know what resource blocks are scheduled for these UEs in the DL.

Referring to FIG. 4, in steps 150, as in the carrier aggregation based approach, the femtocell base station detects and identifies UL interference from nearby macrocell mobile stations. The femtocell base stations determine if interference conditions have changed. If interference conditions have changed, the femtocell base stations identify the UL frequency spectrum that is receiving the interference. For example, femtocells base stations HeNB-A and HeNB-B sense the spectrum during the UL transmissions from FUE-A 3 and FUE-B 8, respectively, to detect and identify interference from UEs. Because interference conditions have changed as a result of the re-scheduling of the UL resource blocks for UE-1, UE-2, and UE-3 at step 60, femtocell base station may identify interference at the UL spectrum. Thus, HeNB-A may identify interference at resource blocks scheduled for UL use by UE-1,UE-2 as shown in FIG. 10 during the UL of FUE-A. Similarly, HeNB-B may identify interference at the resource blocks scheduled for uplink use by UE-3 during the UL of FUE-B. At step 200, the femtocell base station may schedule its femtocell mobile station spectral allocations based upon the identified interference from step 150. For example, HeNB-A re-schedules UL of FUE-A to use resource blocks other than those scheduled for UL use by UE-1, UE-2 as shown in FIG. 10. Similarly, HeNB-B also re-schedules UL of FUE-B to use resource blocks other than those encompassed by the 0.72 MHz frequency range scheduled for UL use by UE-3. Thus, due to the higher priority given to macrocells for use of the resource blocks, HeNB-A has released 20 resource blocks previously scheduled for FUE-A. HeNB-B has also released 12 blocks previously scheduled for FUE-B.

Referring back to FIG. 4, at step 160, the femtocell base station re-schedules resource blocks for DL use by its femtocell mobile stations to mitigate DL interference. As mentioned, the allocation of resource blocks for DL/UL in the macrocell base station may dynamically change as a function of changing resource requirements of the macrocell mobile stations. As a result, even though the femtocell base station may use the DL/UL mapping function to determine the first DL resource block used by the interfering UEs from the first UL resource block detected as being used by the interfering UEs, the femtocell base station may not know the number of DL resource blocks allocated for use by the interfering UEs. In the absence of knowledge about the DL resource blocks of nearby macrocell mobile stations, the femtocell base station may assume that the number of resource blocks scheduled for DL and UL use by the macrocell mobile stations is the same. In this embodiment of the DL/UL mapping function, the first DL resource blocks allocated for the interfering UEs are offset from the first DL resource block available in the spectrum by the same amount as the offset of the first allocated UL resource blocks from the first UL resource block available in the spectrum. The DL/UL mapping function used by the femtocell base station in the resource partitioning based approach may then be the identity function. Therefore, the femtocell base station may assume that the DL resource blocks of the interfering UEs correspond to the UL resource blocks. In addition, the femtocell base station may re-schedule its femtocell mobile stations to use the corresponding resource blocks for DL as those used for UL. As shown in FIG. 9, HeNB-A has re-scheduled for DL use by FUE-A the corresponding resource blocks re-scheduled for its UL use by releasing 20 resource blocks. Use of these re-scheduled resource blocks for DL by FUE-A avoids using the resource blocks scheduled for DL use by UE-1,UE-2 except for the 12 resource blocks enclosed within the dark rectangle. Similarly, HeNB-B has re-scheduled for DL use by FUE-B the corresponding resource blocks re-scheduled for its UL use by releasing 12 resource blocks. Use of these re-scheduled resource blocks for DL by FUE-B avoids using the resource blocks scheduled for DL use by UE-3 except for the 4 resource blocks enclosed in the dark rectangle.

Figure 11:
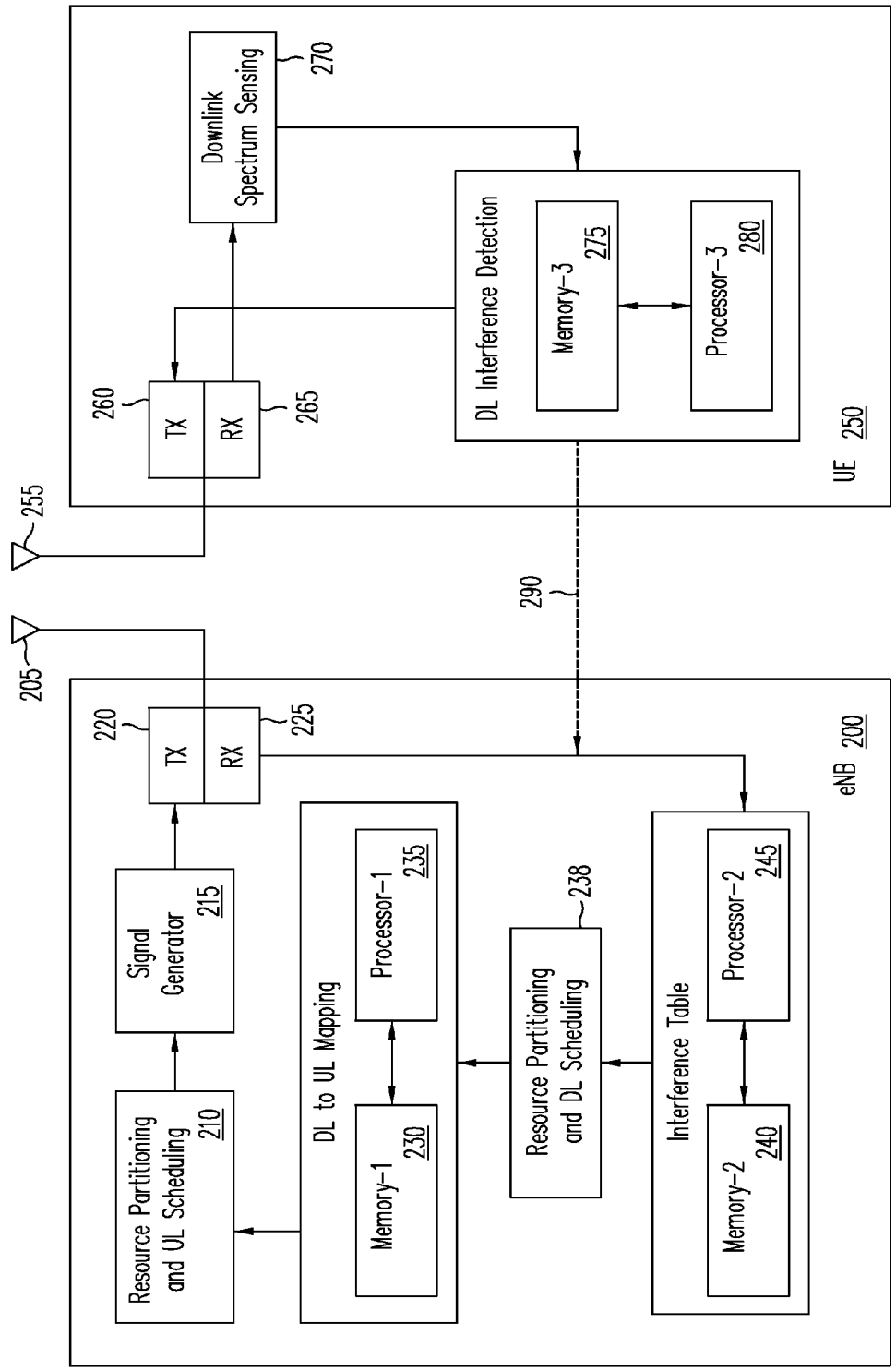
FIG. 11 shows a block diagram of a macrocell base station and a macrocell mobile station for implementing the ICIA method of FIGS. 3 and 4 according to one or more embodiments of the present disclosure.

FIG. 11 shows a block diagram of a macrocell base station eNB 200 and a macrocell mobile station MUE 250 for implementing the ICIA method of FIGS. 3 and 4 according to one or more embodiments of the present disclosure. MUE 250 receives DL signal through antenna 255 and receiver front end RX 265, and uses downlink spectrum sensing module 270 to identify whether there are any interfering femtocells. If there is any interfering femtocell, MUE 250 records and stores identification information of the interfering femtocell in a memory block memory-3 275. Moreover, information such as the interference strength, interfered sub-bands, etc. may also be stored in memory-3 275. A processing block processor-3 280 obtains a report on the interfering femtocells from memory-3 275 and transmits this information 290 to eNB 200 through transmitter TX 260 and antenna 255.

Macrocell eNB 200 receives information 290 from each UE connected to eNB 200 through antenna 205 and receiver front end 225, and stores information 290 in a memory block memory-2 240. A processor block processor-2 245 reads and processes information 290 to obtain an interference table of UEs and the corresponding interfering femtocells similar to that of Table I. Based on the interfering table, eNB 200 uses block 238 to perform resource partitioning and re-scheduling of the DL resources for use by UEs receiving femtocell interference. As discussed in FIG. 6 and FIG. 9, eNB 200 may re-schedule component carriers in the carrier aggregation approach or resource blocks in the resource partitioning approach to satisfy the DL bandwidth requirement through allocating fewer resources at the cost of a diminished diversity gain. Processor-1 235 and memory-1 230 then perform DL to UL mapping to determine the UL resources to be used by each interfered UE based on the re-scheduled DL resources. Block 210 performs resource partitioning and re-scheduling of the UL resources for UEs based on results of the DL to UL mapping. Information on the re-scheduled DL and UL resources may be transmitted from eNB 200 to each MUE 250 through signal generator 215, transmitter TX 220, and antenna 205. As noted before, as long as MUE 250 does not transmit information 290 to eNB 200 to trigger the ICU mechanism, eNB 200 will continue to schedule MUE 250 in the conventional way, such as scheduling MUE 250 to utilize all available resources.

Figure 12:
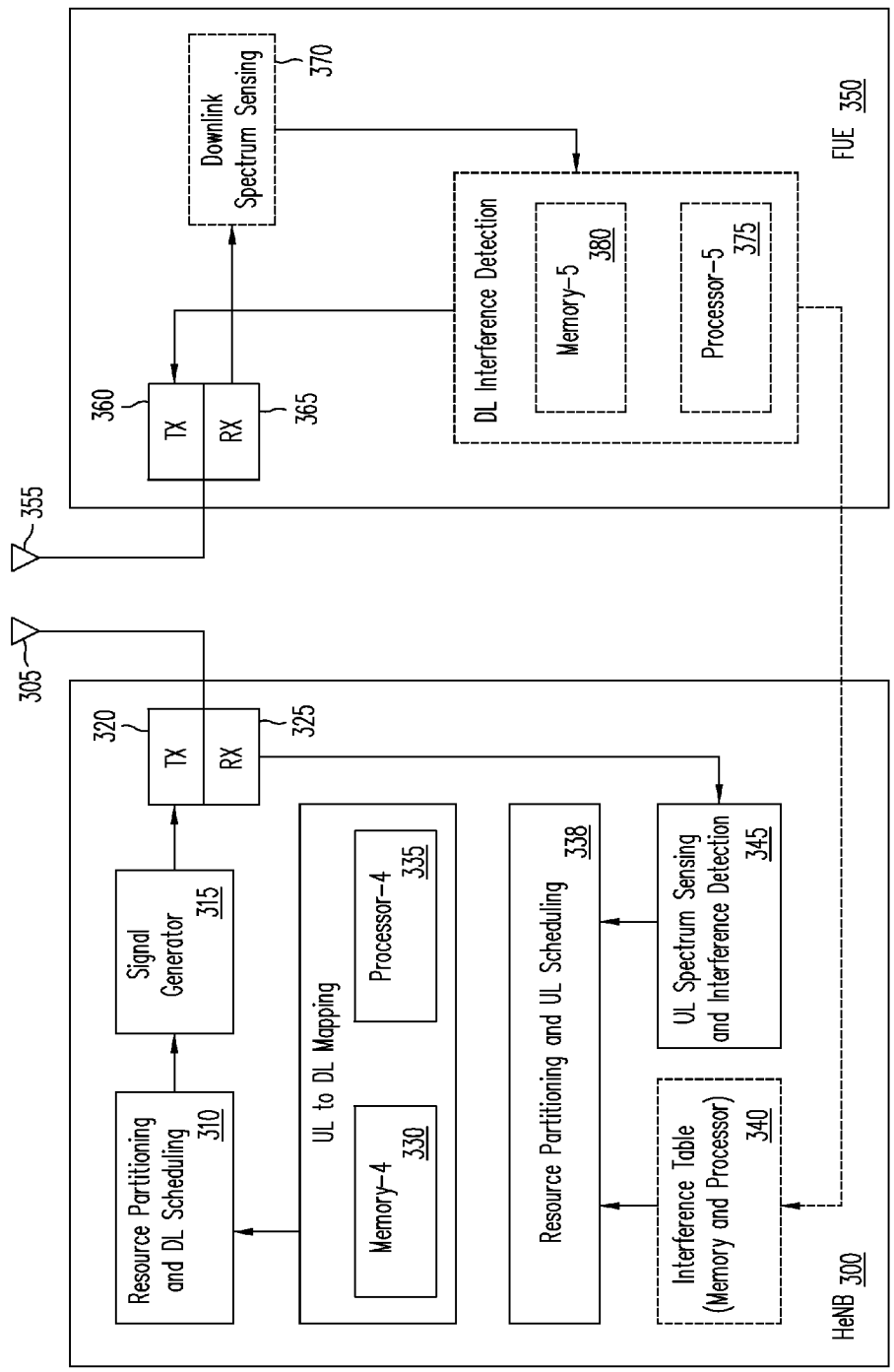
FIG. 12 shows a block diagram of a femtocell base station and a femtocell mobile station for implementing the ICIA method of FIGS. 3 and 4 according to one or more embodiments of the present disclosure.

FIG. 12 shows a block diagram of a femtocell base station HeNB 300 and a femtocell user FUE 350 for implementing the ICIA method of FIGS. 3 and 4 according to one or more embodiments of the present disclosure. HeNB 300 receives UL signal from FUE 350 through antenna 305 and receiver front end RX 325. During the UL reception, HeNB 300 senses spectrum using UL spectrum sensing and interference module 345 to detect for interfering UEs. Information on interfering UEs and UL resources detected as receiving interference from the interfering UEs may be stored in an interference table 340. If there are any changes in the interfering conditions detected from the UEs, HeNB 300 performs resource partitioning and UL re-scheduling using block 338 to re-schedule UL resources for FUE 350. The re-scheduling of the UL resources for FUE 350 attempts to avoid using the detected UL resources from the interfering UEs. For example, HeNB 300 may re-schedule component carriers in the carrier aggregation approach or resource blocks in the resource partitioning approach to avoid using the UL resources used by the interfering UEs. Note that if macrocell eNB 200 of FIG. 11 has not performed its re-scheduling decisions for interfering UEs by allocating fewer UL resources, HeNB 300 may observe interference that is spread over all the available UL resources. In such case, HeNB 300 may continue using the conventional method for scheduling decisions, such as continuing to use all the available spectrum resources until eNB 200 re-schedules UL resources for the interfering UEs.

After HeNB 300 re-schedules UL resources for FUE 350, processor-4 335 and memory-4 330 may perform UL to DL mapping based on the detected UL resources from the interfering UEs. Using the same DL/UL coupling information as stored in the DL/UL mapping function of macrocell eNB 200, HeNB 300 may determine the DL resources scheduled for DL use by the interfering UEs. Alternatively, as discussed for the resource partitioning approach, HeNB 300 may assume that the DL and UL of the interfering UEs use the same resources and use an identity function for the UL to DL mapping to determine the DL resources for the interfering UEs. Block 310 performs resource partitioning and re-scheduling of the DL resources for FUE 350 based on the results of the DL to UL mapping to avoid using the same DL resources scheduled for use by the interfering UEs. Information on the re-scheduled DL and UL resources may be transmitted from HeNB 300 to each FUE 350 through signal generator 315, transmitter TX 320, and antenna 305.

To improve femtocell sensing performance, FUE 350 may optionally use downlink spectrum sensing module 370 to identify whether there are any interfering macrocells. If there are any interfering macrocells, FUE 350 may store information on the interference in a memory block memory-5 380. Such information may include interference strength or the DL resources detected as receiving interference. A processing block processor-5 375 obtains a report on the interfering macrocells from memory-5 380 and transmits the report to HeNB 300. HeNB 300 stores this report along with information on interfering UEs and UL resources detected as receiving interference in interference table 340.

Figure 13:
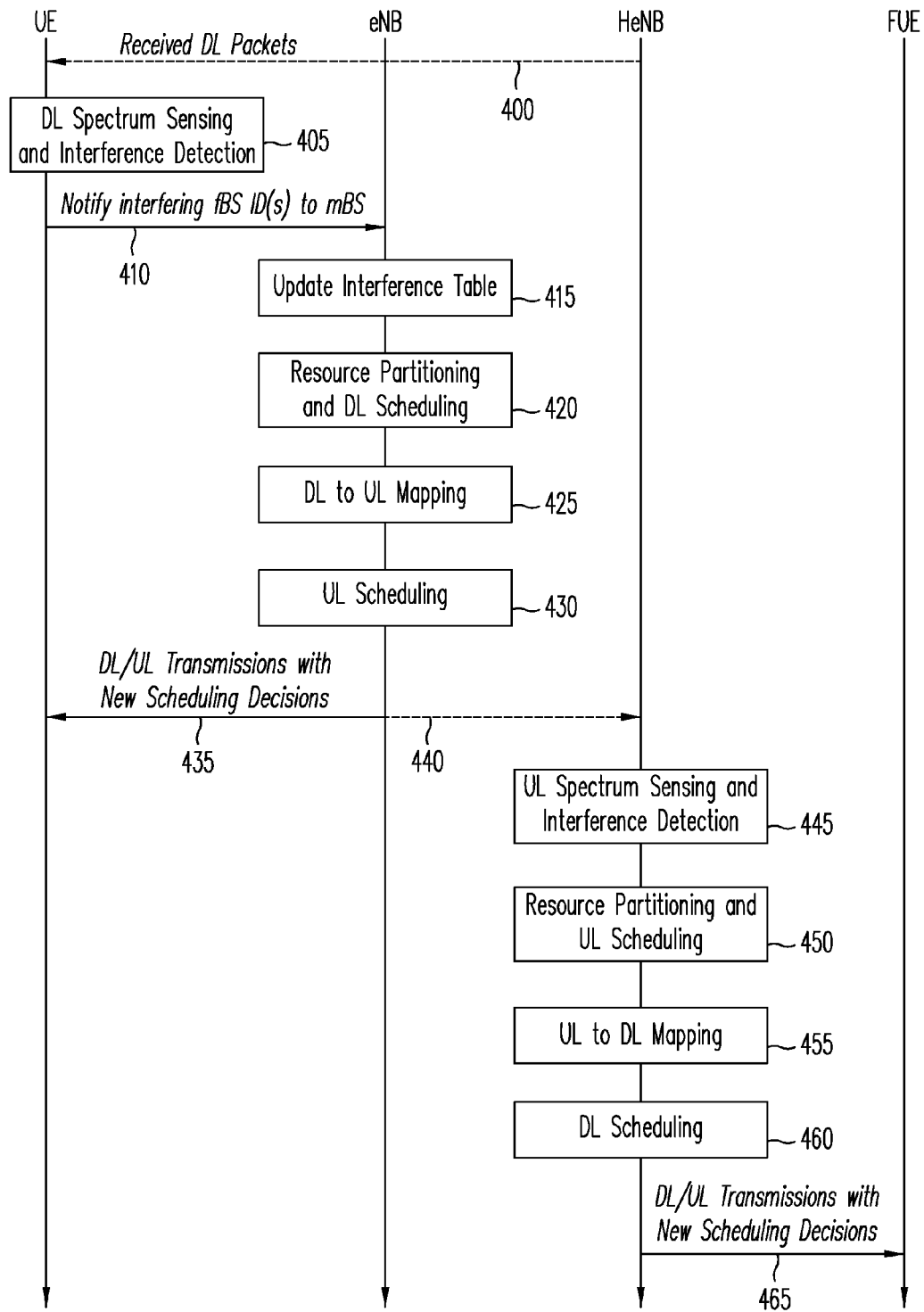
FIG. 13 shows a timing diagram for message exchanges and actions taken at a macrocell mobile station, a macrocell base station, a femtocell base station, and a femtocell mobile station implementing the ICIA method of FIGS. 3 and 4 according to one or more embodiments of the present disclosure.

FIG. 13 shows a timing diagram for message exchanges and actions taken at a macrocell mobile station MUE, a macrocell base station eNB, a femtocell base station HeNB, and a femtocell mobile station FUE for implementing the ICIA method of FIGS. 3 and 4 according to one or more embodiments of the present disclosure. MUE receives DL transmission 400 and performs DL spectrum sensing and interference detection at 405 to detect and identify any interfering HeNB. MUE transmits identification information and other information on the interfering HeNB to eNB at 410. Macrocell eNB uses the information from MUE to update an interference table of MUEs and the corresponding interfering HeNB at 415. Macrocell eNB performs resource partitioning and re-scheduling of the DL resources for use by MUE at 420, DL to UL mapping to determine the UL resources to be used by MUE at 425, and UL re-scheduling at 430. Macrocell eNB then transmits using the re-scheduled DL resources and also transmits information on the re-scheduled DL/UL resources to MUE at 435.

The DL/UL resource scheduling changes at interfering MUE are sensed by HeNB during UL transmission from FUE by performing UL spectrum sensing and interference detection at 445. HeNB performs resource partitioning and UL re-scheduling for FUE to avoid using the detected UL resources from the interfering MUE at 450. HeNB may also perform UL to DL mapping based on the detected interfering UL resources using the same DL/UL mapping information as in the eNB to determine DL resources scheduled for use by the interfering MUE at 455. HeNB further performs DL re-scheduling for FUE to avoid using the DL resources scheduled for use by the interfering MUE at 460, transmits using the re-scheduled DL resources and also transmits information on the re-scheduled DL and UL resources to FUE at 465.

The spectrum sensing by MUE during the DL and by HeNB during the UL may be based on energy detection. Alternatively, spectrum sensing may use other techniques based on autocorrelation or a peak-to-average power ratio. For the energy detection based approach, a detection threshold may be set high enough to avoid false alarms in order to benefit from the multiuser diversity as much as possible. This will ensure that the ICIA technique as disclosed will be triggered only in very high interference scenarios.

The various components described herein may be implemented with appropriate hardware and/or software to perform the various operations described herein. For example, in various embodiments, such components may include one or more processors, logic, memory, machine readable instructions (e.g., software, firmware, or other instructions stored in a memory or a machine readable medium), and/or other components as may be desired in particular implementations.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the disclosure. It should also be understood that numerous modifications and variations are possible in accordance with the principles of the present disclosure. Accordingly, the scope of the disclosure is defined only by the following claims.

What is claimed is:

1. A method, comprising:
    sensing downlink (DL) interference at a macrocell mobile station of a macrocell network from a femtocell base station of a co-channel femtocell network within a coverage area of the macrocell network, wherein the macrocell mobile station is initially scheduled in the DL in resource blocks spanning a first bandwidth;
    re-scheduling uplink (UL) and DL spectrum resources for the macrocell mobile station to address the interference such that the mobile station is rescheduled in the DL in first resource blocks spanning a second bandwidth that is less than the first bandwidth;
    sensing a change in UL interference at the femtocell base station responsive to the re-scheduling for the macrocell mobile station; and
    re-scheduling femtocell UL and DL spectrum resources for a femtocell mobile station within the femtocell network to address the change in UL interference such that the re-scheduling in the UL for the femtocell network avoids at least some of the first resource blocks.

2. The method of claim 1, wherein said re-scheduling UL and DL spectrum resources for the macrocell mobile station comprises:
    using a DL/UL mapping function to map the re-scheduled DL resources to generate re-scheduled UL resources.

3. The method of claim 2, wherein said re-scheduling UL and DL spectrum resources for the femtocell mobile station comprises:
    re-scheduling the UL resources of the femtocell network to avoid using UL resources of the femtocell network sensed as receiving interference from the macrocell network;
    using the DL/UL mapping function to map the UL resources of the femtocell network sensed as receiving interference from the macrocell network to determine DL resources of the femtocell network expected to receive interference from the macrocell network; and
    re-scheduling DL resources of the femtocell network to avoid using the DL resources of the femtocell network expected to receive interference from the first cellular network.

4. The method of claim 1, wherein said sensing DL interference comprises generating an interference table to identify victim macrocell mobile stations.

5. The method of claim 4, wherein said re-scheduling DL resources of the first cellular network comprises re-scheduling DL resources for the victim macrocell mobile stations.

6. The method of claim 1, wherein the DL resources and the UL resources for the macrocell network and the femtocell network comprises a plurality of component carriers.

7. The method of claim 1, wherein said sensing DL interference and sensing a change in UL interference comprises detecting energy of the interference and comparing the energy to a detection threshold, wherein the detection threshold is set high enough to minimize false alarm.

8. A macrocell base station configured for inter-cell interference avoidance comprising:
    a re-scheduler module adapted to re-schedule uplink (UL) and DL spectrum resources of a macrocell network responsive to reception from a macrocell mobile station of an identification of DL resource blocks in which the macrocell mobile station detected interference from a femtocell base station such that the macrocell mobile station is re-scheduled in DL resource blocks spanning a reduced bandwidth.

9. The macrocell base station of claim 8, wherein the re-scheduler module further comprises:
    a DL re-scheduler module of the first cellular network adapted to generate re-scheduled DL resources; and
    a memory containing a DL/UL mapping table adapted to generate re-scheduled UL resources from the re-scheduled DL resources.

10. The macrocell base station of claim 9, wherein the base station is further adapted to transmit the re-scheduled DL resources and the re-scheduled UL resources to the macrocell mobile station.

11. A femtocell base station for a femtocell network comprising:
    an uplink (UL) spectrum sensing module adapted to detect a change in UL interference from a macrocell network; and
    a re-scheduler module, wherein the re-scheduler module is adapted to:
        re-schedule UL resources of the femtocell network to avoid using UL resources of the femtocell network sensed as receiving interference from the macrocell network; and
        re-schedule DL resources of the femtocell network based upon a DL-to-UL mapping.

* * * * *